United States Patent
Salsedo

(10) Patent No.: US 10,660,354 B2
(45) Date of Patent: May 26, 2020

(54) METHOD FOR PRODUCING A COOKED FOOD PRODUCT

(71) Applicant: Luc Salsedo, Nice (FR)

(72) Inventor: Luc Salsedo, Nice (FR)

(73) Assignee: La Nicoise, Nice (FR)

(*) Notice: Subject to any disclaimer, the term of this patent is extended or adjusted under 35 U.S.C. 154(b) by 270 days.

(21) Appl. No.: 15/523,980

(22) PCT Filed: Nov. 5, 2015

(86) PCT No.: PCT/IB2015/002290
§ 371 (c)(1),
(2) Date: May 3, 2017

(87) PCT Pub. No.: WO2016/071768
PCT Pub. Date: May 12, 2016

(65) Prior Publication Data
US 2017/0332679 A1  Nov. 23, 2017

(30) Foreign Application Priority Data
Nov. 5, 2014 (GB) .................................. 1419678.6

(51) Int. Cl.
A23L 11/00 (2016.01)
A23L 7/13 (2016.01)

(52) U.S. Cl.
CPC .................. *A23L 11/05* (2016.08); *A23L 7/13* (2016.08)

(58) Field of Classification Search
CPC ....................................................... A23L 11/05
See application file for complete search history.

(56) References Cited

U.S. PATENT DOCUMENTS

| 4,876,101 A | 10/1989 | Willard |
| 5,401,522 A | 3/1995 | Reeg |
| 2007/0087107 A1* | 4/2007 | Borders .................. A23P 30/20 426/634 |

FOREIGN PATENT DOCUMENTS

| EP | 2491799 A1 | 8/2012 |
| JP | 09-084541 A | 3/1997 |

OTHER PUBLICATIONS

"Garbonzo Beans: Chickpeas". Available online from www.whfoods.com as of May 4, 2012. pp. 1-15. (Year: 2012).*
Machine translation of JP 09-084541. Publication date: Mar. 31, 1997. pp. 1-5. (Year: 1997).*
Salzman, "Chickpea burger recipe". Available online as of Jun. 1, 2012 from pamelasalzman.com. pp. 1-27. (Year: 2012).*

* cited by examiner

*Primary Examiner* — Jenna A Watts
(74) *Attorney, Agent, or Firm* — Gregory L. Porter; Hunton Andrews Kurth LLP

(57) ABSTRACT

Method for producing a cooked food product, the method comprising the steps of: selecting a raw material, comprising chick peas, grinding the raw material to obtain a flour, hydrating the flour with water to obtain a flour mixture, preparing an oil mixture comprising at least olive oil and water, mixing the flour mixture and the oil mixture to obtain a batter, cooling and storing the batter to obtain a gel, cutting the gel to obtain individual food elements, and cooking the food elements to obtain a cooked food product, wherein the method is characterised in that, prior to the step of mixing the flour mixture and oil mixture, the oil mixture is heated, wherein the flour mixture is heated by mixing the flour mixture and the oil mixture due to transfer of heat contained in the oil mixture.

16 Claims, No Drawings

METHOD FOR PRODUCING A COOKED FOOD PRODUCT

BACKGROUND

The invention relates to a method for producing a cooked food product. The invention in particular relates to the production of a cooked food product wherein the cooked food product comprises chick pea flour.

In the prior art, it is known to use raw material in the form of cereal grains to produce a flour, wherein the flour is used to prepare a dough. The dough is conditioned to obtain an intermediate product which can be sliced to obtain individual food elements. The individual food elements are cooked to obtain the cooked food product.

The U.S. Pat. No. 4,876,101 discloses a continuous process for producing a fried snack food, wherein a raw material composing cereal grains is ground to obtain flour. The flour is hydrated with water to produce a grain/water slurry. The formed grain/water slurry is cooked at a temperature above the gelatinisation temperature of starch to allow the formation of a gel.

In a next step of the production process, the formed gel is cooled to allow the gelatinised starch in the gel to set back. In a further step of the procedure the cooled gelatinised ground gram is mixed with dry snack food ingredients to form a dough. The dry snack food ingredient will be used to provide a specific flavour to the food product. Once the dough has been obtained, the dough is formed or cut into individual food pieces which can be fried at a determined temperature to obtain a fried food product.

In the production of cooked food products, the handling of the flour, the mixture thereof with water and the seasoning thereof with additional food additives is particularly sensitive. It is important to control the different steps of the production process to obtain at the end of the production process, a cooked food product having the different ingredients properly dispersed over the entirety of the individual food elements. Moreover, a production process must be controlled to obtain an end product with proper nutritional properties and a texture which allows storing and shipment of the end product. Moreover, the end product should have a shape and texture which allow the consumer of the cooked food product to experience pleasant handling, consumption and digestion of the cooked food product.

One of the problems encountered during the production process of a cooked food product disclosed in U.S. Pat. No. 4,876,101 is the fact that if the flour is hydrated by water and thereafter is cooked, the flour mixture could easily be burned when the heat dispersion is not sufficiently progressive and equal over the flour mixture. A related problem is the fact that parts of the flour mixture under the influence of heat can easily be stuck against the wall of the device wherein the flour mixture is heated. In case mechanical stirring is used during the heating of the flour mixture, the flour mixture can easily be stuck against the used mechanical stirring elements.

In view of the observations above, it is an object of the present invention to provide a process for the production of a cooked food product, such as a fried food product, which allows a bettor control of the production process of a cooked food product and which allows the forming of a gel while avoiding the burning of part of the flour mixture and the sticking of part of the flour mixture to the container walls of a device wherein the flour mixture is heated during the production process.

SUMMARY OF THE INVENTION

According to a first aspect of the invention, the invention relates to a method for producing a cooked food product, comprising the steps of:
  selecting a raw material, comprising chick peas,
  grinding the raw material to obtain a flour,
  hydra ting the flour with water to obtain a flour mixture,
  preparing an oil mixture comprising at least olive oil and water.
  mixing the flour mixture and the oil mixture to obtain a batter,
  cooling and storing the batter to obtain a gel.
  cutting the gel to obtain individual food elements, and
  cooking the food elements to obtain a cooked food product,
wherein the method is characterised in that, prior to the step of mixing the flour mixture and oil mixture, the oil mixture is heated, wherein the flour mixture is heated by mixing the flour mixture and the oil mixture due to transfer of heat contained in the oil mixture.

According to an embodiment of the invention, the raw material comprises Kabuli-type chick peas.

According to a further embodiment of the invention, the percentage in weight of Kabuli-type chick peas is 90% to 100%, preferably 100%.

According to a further embodiment of the invention, the oil mixture is heated to 100° C. before the mixture of the flour mixture and the oil mixture.

According to a further embodiment of the invention, after the mixing of the flour mixture and the oil mixture, the batter is heated to a target temperature of 100° C.

According to a further embodiment of the invention, the batter is heated while the batter is mechanically agitated to obtain proper mixing of the ingredients in the batter.

According to a further embodiment of the invention, prior to the step of cooling and storing the batter, the batter is poured into a container having a depth of at least 8 centimetres.

According to a further embodiment of the invention, the step of cooling the batter comprises cooling the batter to an ambient temperature of approximately 16° C. to 20° C. preferably 18° C.

According to a further embodiment of the invention, the step of storing the batter comprises storing the batter at a temperature between 3° C. and 5° C. during the time period between 10 and 14 hours, preferably 12 hours.

According to a further embodiment of the invention, the step of cooking the food elements comprises frying the food elements in oil.

According to a further embodiment of the invention, the step of cooking the food elements comprises baking the food elements.

According to a further embodiment of the invention, the step of cooking the food elements comprises frying the food elements in an oil having a smoke point higher than the smoke point of olive oil.

According to a further embodiment of the invention, the step of frying the food elements comprises frying the food elements in sunflower oil.

According to a further embodiment of the invention, the step of frying the food elements comprises frying the food elements in a vegetable oil, other than ground nut oil.

According to a further embodiment of the invention, the step of frying the food elements comprises frying the food elements at a temperature between 170° C. and 180° C.

According to a further embodiment of the invention, the step of frying the food elements comprises moving the food elements inside the oil to ensure even cooking.

According to an embodiment of the invention, the step of frying the food elements comprises frying the food elements for a time interval of 2-3 minutes.

DETAILED DESCRIPTION

The invention relates to an improved method for producing a cooked food product wherein several steps of the production process are improved to obtain an end product with improved nutritional value and texture. In the present text, the words "cook", "cooked" and "cooking" are used. Those words are meant to refer to the preparation of food, especially using heat. In the context of the description, cooking includes, for example, frying and baking.

According to the invention, in a first step, a raw material Is used to produce flour. According to the invention, the selected raw material contains substantially chick peas. In particular. Kabuli-type chick peas should be selected wherein the percentage in weight of the Kabuli-type chick peas is preferably at least 90% of the total weight of the raw material. More preferably the percentage and weight of the Kabuli-type chick peas is as close as possible to 100%.

After the selection of the raw material, the raw material is ground to obtain a flour. Any adapted production process can be used to obtain the flour. Care should be taken that the chick peas are not overheated which could destroy the nutritional value of the final product. To control the further production steps, preferably the particle size of the particles in the flour is less than 149 micrometres.

After the step of obtaining the flour, the flour is hydrated with water to obtain a flour/water slurry. In the remainder of the text, this flour/water slurry is referred to as the flour mixture. The water used for hydrating the flour mixture is of ambient temperature, which means that the temperature of the water will be between 15° C. and 25° C. preferably around 18° C. The flour mixture will not be heated by any mechanical means as such. However, the flour mixture will be mixed with an oil mixture.

According to the invention, the oil mixture is obtained by mixing at least olive oil and water. The oil mixture further comprises additives such as salt and pepper which are used to obtain a desired flavour for the final product. The oil mixture is heated to a target temperature of 100° C. During the heating of the oil mixture, the different components are stirred to improve the mixing of the different ingredients.

Thereafter, the relatively cold flour mixture having an "ambient temperature" of 15° C. to 25° C. added to the oil mixture and as a result is heated with the relatively hot (approximately 100° C.) oil mixture. The fact that the oil mixture is relatively hot means that the oil mixture contains a certain quantity of heat which is, by mixing of the flour mixture and oil mixture, transferred to the flour mixture to thereby increase the temperature of the Pour mixture. The mixing of the flour mixture and the oil mixture will result in a batter wherein the ingredients are evenly mixed. This batter is heated at a temperature of 100° C. in a mechanically agitated water bath kettle. This allows for constant stirring of the batter to facilitate incorporation of the oil in the batter.

The fact that the batter is heated to a target temperature of 100° C. means that the batter is heated to a temperature above the gelatinisation temperature of the starch available in the batter. After the step of heating and mixing the batter, the batter is poured out into containers which have a depth of at least 8 centimetres. In the containers, the batter is cooled to an ambient temperature to allow the batter to form a gel and stabilise.

In a further step, the obtained gel is stored at a temperature between preferably 3° C. and 5° C. The gel remains stored for a time period of at least 12 hours. The now obtained gel can be used for a time period of approximately 60 hours and can be cut into individual food elements which are ready to be cooked.

After the gel is removed from the cold storage, it can be cut into blocks of approximately 8 cm×6 cm×30 cm. To obtain an optimal size, the blocks can be sliced into rectangles having a thickness of 2 to 2.5 mm.

According to a first alternative, the mentioned rectangles can be fried in oil having a smoke point temperature which is higher than that of the olive oil used in the batter. According to a first example, the food elements could be fried in sunflower oil. Another possibility is to fry the food elements in a vegetable oil other than groundnut oil.

The frying of the individual food elements is preferably between 170° C. and 180° C. If the temperature at which the food elements are fried is lower than 170° C., the final product risks to be greasy both in touch and taste. At a temperature higher than 180° C. the product tends to burn and overbrown.

During the step of frying the food element in the oil, the individual food elements must be turned constantly to ensure even cooking and to prevent burning. The length of time of frying of the individual food elements in the oil will determine the end colour of the fried food product. The longer the food elements remain in the oil, the darker the colour of the final product. Typically, the frying time is between 2 and 3 minutes. After the step of frying the individual food elements to obtain the fried food product, the final product can be cooled down before packaging.

According to a second alternative, the step of cooking the individual food element comprises baking the mentioned rectangles in order to obtain the cooked food product.

The above described method allows for a final fried food product which has advantageous characteristics both to nutritional composition and texture.

The invention claimed is:

1. Method for producing a cooked food product, the method comprising the steps of:
   selecting a raw material, comprising chick peas,
   grinding the raw material to obtain a flour,
   hydrating the flour with water to obtain a flour mixture,
   preparing a oil mixture comprising at least olive oil and water,
   mixing the flour mixture and the oil mixture to obtain a batter comprising a starch,
   heating the batter to a temperature above the gelatinization temperature of the starch,
   cooling and storing the batter to obtain a gel,
   cutting the gel to obtain individual food elements, and
   cooking the food elements to obtain a cooked food product,
   wherein the method is characterised in that, prior to the step of mixing the flour mixture and oil mixture, the oil mixture is heated to 100° C., wherein the flour mixture is heated by mixing the flour mixture and the oil mixture due to transfer of heat contained in the oil mixture.

2. Method according to claim 1, wherein the raw material comprises Kabuli-type chick peas.

3. Method according to claim 2, wherein the percentage in weight of Kabuli-type chick peas is 90% to 100%.

4. Method according to claim 1, wherein after the mixing of the flour mixture and the oil mixture, the batter is heated to a target temperature of 100° C.

5. Method according to claim 4, wherein the batter is heated while the batter is mechanically agitated to obtain proper mixing of the ingredients in the batter.

6. Method according to claim 1, wherein prior to the step of cooling and storing the batter, the batter is poured into a container having a depth of at least 8 centimetres.

7. Method according to claim 1, wherein the step of cooling the batter comprises cooling the batter to an ambient temperature of approximately 16° C. to 20° C.

8. Method according to claim 1, wherein the step of storing the batter comprises storing the batter at a temperature between 3° C. and 5° C. during the time period between 10 and 14 hours.

9. Method according to claim 1, wherein the step of cooking the food elements comprises frying the food elements in oil.

10. Method according to claim 1, wherein the step of cooking the food elements comprises baking the food elements.

11. Method according to claim 9, wherein the step of cooking the food elements comprises frying the food elements in an oil having a smoke point higher than the smoke point of olive oil.

12. Method according to claim 11, wherein the step of frying the food elements comprises frying the food elements in sunflower oil.

13. Method according to claim 11, wherein the step of frying the food elements comprises frying the food elements in a vegetable oil, other than ground nut oil.

14. Method according to claim 9, wherein the step of frying the food elements comprises frying the food elements at a temperature between 170° C. and 180° C.

15. Method according to claim 9, wherein the step of frying the food elements comprises moving the food elements inside the oil to ensure even cooking.

16. Method according to claim 9, wherein the step of frying the food elements comprises frying the food elements for a time interval of 2-3 minutes.

* * * * *